(12) United States Patent
Yang et al.

(10) Patent No.: US 10,996,421 B2
(45) Date of Patent: May 4, 2021

(54) LENS ASSEMBLY AND CAMERA MODULE

(71) Applicant: Samsung Electro-Mechanics Co., Ltd., Suwon-si (KR)

(72) Inventors: Dong Shin Yang, Suwon-si (KR); Hwan Soo Park, Suwon-si (KR); Ju Sung Park, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 229 days.

(21) Appl. No.: 16/192,861

(22) Filed: Nov. 16, 2018

(65) Prior Publication Data

US 2019/0179098 A1  Jun. 13, 2019

(30) Foreign Application Priority Data

Dec. 12, 2017 (KR) ......................... 10-2017-0170319
Mar. 27, 2018 (KR) ......................... 10-2018-0035442

(51) Int. Cl.
  *G02B 7/02* (2021.01)
  *H04N 5/225* (2006.01)
  *G02B 13/00* (2006.01)

(52) U.S. Cl.
  CPC .............. *G02B 7/02* (2013.01); *G02B 7/021* (2013.01); *G02B 7/022* (2013.01); *H04N 5/2254* (2013.01); *G02B 13/001* (2013.01); *H04N 5/2253* (2013.01)

(58) Field of Classification Search
  CPC .......... G02B 7/02; G02B 7/021; G02B 7/025; G02B 7/022; G02B 7/026; G02B 7/023;

(Continued)

(56) References Cited

U.S. PATENT DOCUMENTS

2007/0196102 A1  8/2007  Miyoshi
2008/0204910 A1  8/2008  Chiang
(Continued)

FOREIGN PATENT DOCUMENTS

CN  101025542 A  8/2007
CN  101256256 A  9/2008
(Continued)

OTHER PUBLICATIONS

Korean Office Action dated Jul. 15, 2019 in corresponding Korean Application No. 10-2018-0035442 (11 pages in English, 7 pages in Korean).

(Continued)

*Primary Examiner* — William R Alexander
*Assistant Examiner* — Sharrief I Broome
(74) *Attorney, Agent, or Firm* — NSIP Law

(57) ABSTRACT

A lens assembly includes a lens having an optical portion and a flange portion at a periphery of the optical portion, a spacer having an incident hole through which light passes, and a lens barrel accommodating the lens and the spacer. The lens includes a first D-cut portion and a second D-cut portion formed on a side surface and another side surface of the flange portion in a state of non-contact with the lens barrel, and circular arc portions connecting the first and second D-cut portions to each other. The spacer includes blocking portions having a shape corresponding to a shape of the first and second D-cut portions, and first curved portions having a shape corresponding to a shape of the circular arc portions on an inner side surface, and transmission portions formed in locations in which the blocking portions and the first curved portions are connected to each other.

20 Claims, 11 Drawing Sheets

(58) Field of Classification Search
CPC ........ G02B 7/003; G02B 7/04; G02B 13/001;
G02B 7/08; G02B 23/2476; G02B 27/62;
G02B 3/00; G02B 13/004; G02B
13/0045; G02B 3/0075; G02B 5/003;
G02B 5/00; H04N 5/2254; H04N 5/2257;
H04N 5/2253; H04N 5/2252; H04N
1/113; H04N 2005/2255; H04N 5/2256;
H04N 5/2259; G03B 17/12; G03B 17/14;
G03B 3/10; G03B 17/02; G03B 21/142;
G03B 21/145; G03B 21/28; G03B
11/045; G03B 13/36; G03B 17/08; G03B
17/17; G03B 17/55; G03B 19/023; G03B
21/005; G03B 21/10; G03B 21/2013;
G03B 21/2033; G03B 21/2066; G03B
21/208; G03B 2205/00
See application file for complete search history.

(56) References Cited

U.S. PATENT DOCUMENTS

2013/0265660 A1* 10/2013 Yoshida ................. G02B 7/021
359/811
2014/0254034 A1* 9/2014 Lyu ........................ G02B 7/021
359/819
2014/0368723 A1* 12/2014 Jung .................... H04N 5/2257
348/340
2016/0187670 A1 6/2016 Kim
2017/0160511 A1* 6/2017 Kim ..................... G02B 13/002
2017/0235095 A1* 8/2017 Sekimoto ............. G02B 27/646
359/824

FOREIGN PATENT DOCUMENTS

| CN | 104238063 A | 12/2014 |
|---|---|---|
| CN | 105739218 A | 7/2016 |
| JP | 2008-176078 A | 7/2008 |
| JP | 2017-134306 A | 8/2017 |
| KR | 10-2011-0049242 A | 5/2011 |
| KR | 10-2014-0146980 A | 12/2014 |
| KR | 10-2016-0080627 A | 7/2016 |
| KR | 10-2017-0065955 A | 6/2017 |
| WO | 2016/067731 A1 | 5/2016 |

OTHER PUBLICATIONS

Chinese Office Action dated Aug. 7, 2020 in counterpart Chinese Patent Application No. 201811515873.0 (3 pages in English and 6 pages in Chinese).

* cited by examiner

LENS ASSEMBLY AND CAMERA MODULE

CROSS-REFERENCE TO RELATED APPLICATIONS

This application claims benefit of priority under 35 USC 119(a) of Korean Patent Application Nos. 10-2017-0170319 filed on Dec. 12, 2017, and 10-2018-0035442 filed on Mar. 27, 2018, in the Korean Intellectual Property Office, the disclosures of which are incorporated herein by reference in their entireties for all purposes.

BACKGROUND

1. Field

The present disclosure relates to a lens assembly and a camera module.

2. Description of the Background

Camera modules have been used in portable electronic devices such as smartphones. Recently, miniaturization of camera modules mounted in portable electronic devices has been required in accordance with demand for miniaturization of the portable electronic devices. In addition, improved performance of the camera module has been required separately from the necessity of miniaturization of the camera module.

However, since various configurations should be added to improve the performance of the camera module, it is difficult to reduce a size of the camera module.

Further, in a case in which the size of each configuration of the camera module is simply reduced in order to miniaturize the camera module, unintended reflection of light may occur inside the camera module.

Light reflected from a subject and incident on the inside of a lens barrel is refracted while passing through a plurality of lenses. In this case, the refracted light may be reflected from an inner surface or other configurations of the lens barrel, and in a case in which the reflected light is incident on an image sensor or around the image sensor, a flare phenomenon may occur.

The light reflected from the inside of the camera module is light that is not related to an image formation, and causes a flare or ghost phenomenon in the captured image.

Therefore, a new method for minimizing the size of the camera module while securing the performance of the camera module, and improving quality of the captured image may be desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a lens, the lens includes an optical portion refracting light and a flange portion extended along a periphery of at least a portion of the optical portion, a spacer in contact with the lens and including an incident hole through which the light passes, and a lens barrel accommodating the lens and the spacer. The lens includes a first D-cut portion and a second D-cut portion formed on a side surface and another side surface of the flange portion in a state of non-contact with the lens barrel, and circular arc portions connecting the first D-cut portion and the second D-cut portion to each other. The spacer includes blocking portions having a shape corresponding to a shape of the first D-cut portion and the second D-cut portion, and first curved portions having a shape corresponding to a shape of the circular arc portions on an inner side surface, and transmission portions, having spaces through which the light passes, formed in locations in which the blocking portions and the first curved portions are connected to each other.

The transmission portions may be positioned to correspond to corner regions of an image sensor.

A straight line distance passing through an optical axis between the blocking portions may be shorter than a straight line distance passing through the optical axis between the first curved portions.

The spacer may further include D-cut portions corresponding to the blocking portions and second curved portions corresponding to the first curved portions on an outer side surface.

The shortest distance between the D-cut portion and the blocking portion may be longer than the shortest distance between the first curved portion and the second curved portion.

The shortest distance between the blocking portion and the optical axis may be shorter than the shortest distance between the D-cut portion and the blocking portion.

The blocking portions may protrude toward an optical axis at locations in which the blocking portions and the first curved portions are connected.

The blocking portions may be disposed to be closer to an optical axis than a virtual straight line connecting both ends of the pair of first curved portions opposing each other.

Both end surfaces of the blocking portions may be formed in a curved surface.

The blocking portion may have an inclined shape in which a central portion thereof protrudes further toward an optical axis.

The blocking portion may have a curved surface shape in which a central portion thereof protrudes further toward an optical axis.

A portable electronic device may include the lens assembly disposed in a camera module and a display unit configured to output an image corresponding to light incident through the lens assembly converted into an electrical signal.

In another general aspect, a camera module includes a lens, wherein the lens includes an optical portion refracting light and a flange portion extended along a periphery of at least a portion of the optical portion, a spacer in contact with the lens and including an incident hole through which the light passes, a lens barrel accommodating the lens and the spacer, and an image sensor disposed on a bottom of the lens barrel, wherein D-cut portions including a flat surface in portions corresponding to each other are formed on each of the lens, the spacer, and the lens barrel. Blocking portions corresponding to the D-cut portions are disposed on an inner side surface of the spacer, and the inner side surface of the spacer connected to both ends of the blocking portions in a length direction thereof has a shape depressed inwardly from the blocking portions.

The image sensor may include a rectangular shape, and long sides of the image sensor may be disposed to correspond to the D-cut portions.

A pair of blocking portions opposing each other and a pair of first curved portions connecting the pair of blocking portions to each other may be formed on the inner side surface of the spacer.

The blocking portions and the first curved portions may be discontinuously connected to each other.

The camera module may be a portable electronic device, and may further include a display unit. The camera module may be installed as a front camera of the portable electronic device along with the display unit or as a back camera on a side of the portable electronic device other than a side with the display unit.

In another general aspect, a spacer in a lens assembly, includes an inner side surface defining an incident hole from an object side surface to an image side surface. The inner side surface includes first curved portions disposed opposing each other across the incident hole, and blocking portions disposed between the first curved portions and protruding into the incident hole from the corresponding curved portions. End surfaces of the blocking portions extend from the corresponding blocking portions to the corresponding first curved portions to define transmission portions of the incident hole.

The end surfaces of the blocking portions may be at least one of concave, convex, and inclined to the transmission portions, and the inner side surface along the blocking portions connecting corresponding end portions may be at least one of curved, inclined, concave, and convex to the incident hole.

The spacer may further include D-cut portions corresponding to the blocking portions and second curved portions corresponding to the first curved portions on an outer side surface from the object side surface to the image side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
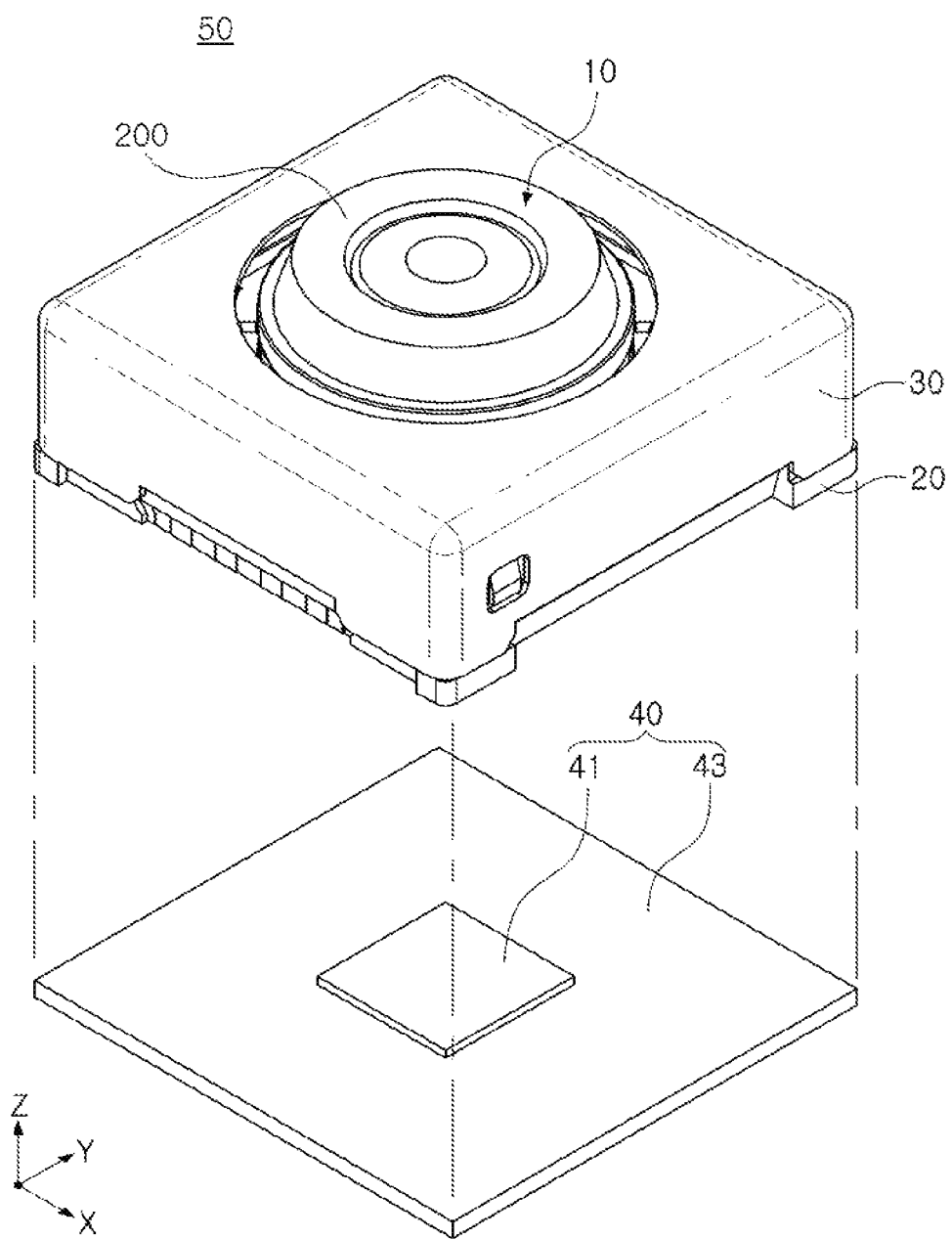
FIG. 1 is a perspective view of a camera module according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "higher," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," "upper," or "higher" relative to another element will then be "below" or "lower" relative to the other element. Thus, the term "above" encompasses both the above and below orientations depending on the spatial orientation of the device and the term "higher" encompasses both the higher and lower orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, refers to at least one example in which such a feature is included or implemented while all examples are not limited thereto.

An aspect of the present disclosure may provide a lens assembly capable of reducing a size of the lens assembly while securing performance of the lens assembly, and a camera module including a lens assembly capable of reducing a size of the lens assembly while securing performance of the lens assembly.

Figure 16A:
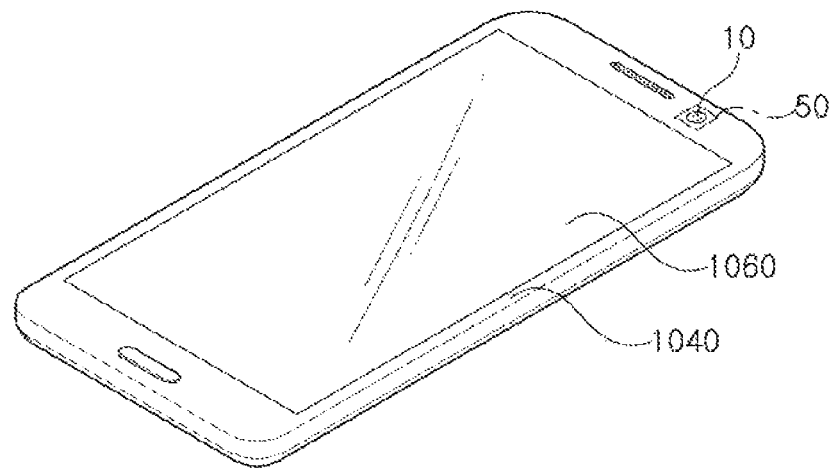
FIGS. 16A and 16B are perspective views of a portable electronic device according to one or more embodiments.
Figure 16B:
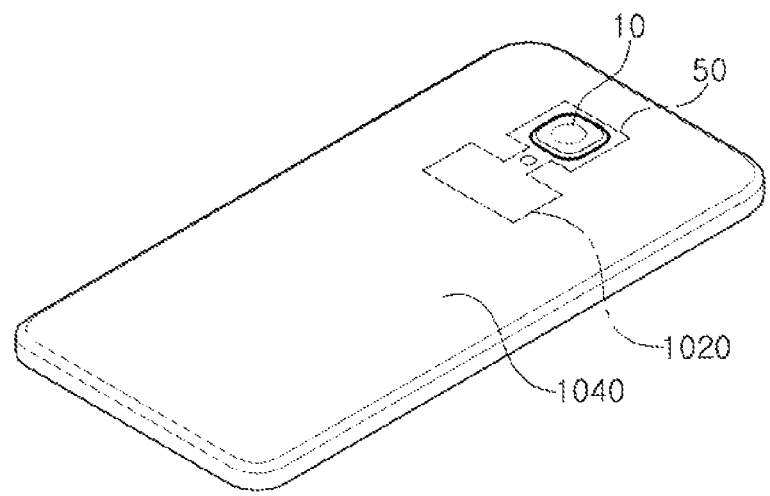

In the present specification, a portable electronic device 1000 may refer to a portable electronic device such as a mobile communication terminal, a smartphone, a tablet PC, or the like (see FIGS. 16A and 16B).

FIG. 1 is a perspective view illustrating a camera module according to one or more embodiments.

Referring to FIG. 1, a camera module 50 may include a lens assembly 10, a housing 20 accommodating the lens assembly 10, a case 30 coupled to the housing 20, and an image sensor module 40 converting light incident through the lens assembly 10 into an electrical signal.

The lens assembly 10 may include a lens barrel 200 and at least one lens.

At least one lens is accommodated in the lens barrel 200. The at least one lens may be arranged from an object side to an image side (an image sensor 41 side) along an optical axis direction.

In a case in which the at least one lens includes a plurality of lenses, each lens may have optical characteristics such as the same or different refraction power or the like.

The lens assembly 10 may be accommodated in the housing 20.

As an example, the housing 20 may have a shape of which the top and the bottom are opened, and the lens barrel 200 may be accommodated in an internal space of the housing 20.

The image sensor module 40 may be disposed on the bottom of the housing 20.

In addition, an actuator that moves the lens assembly 10 for focusing and/or image stabilization may be disposed on the housing 20.

The lens assembly 10 may be moved in the optical axis direction (Z-axis direction) by the actuator to perform the focusing, and may be moved in a direction (X-axis direction and/or Y-axis direction) perpendicular to the optical axis to perform the image stabilization at the time of capturing the image.

The case 30 may be coupled to the housing 20, and may serve to protect internal components of the camera module 50.

In addition, the case 30 may serve to shield electromagnetic waves.

As an example, the case 30 may shield electromagnetic waves generated from the camera module 50 so that the electromagnetic waves do not have an influence on other electronic components 1020 in the portable electronic device 1000. Other electronic components 1020 in the portable electronic device 1000 may include an antenna device configured to transmit and receive signals, a memory device configured to store and retrieve information, a processing unit configured to process information and control a device, a source of power, such as a battery, a power transmission device, and the like. The components 1020 may be mounted in a cover 1040 and the cover 1040 may have an opening where the lens assembly 10 is disposed. The opening may be on a back, side, and/or front of the cover 1040.

In addition, since several electronic components 1020 as well as the camera module 50 are mounted in the portable electronic device 1000, the case 30 may shield electromagnetic waves generated from these electronic components 1020 so that the electromagnetic waves do not have an influence on the camera module 50.

The case 30 may be formed of a metal and be thus grounded to a ground pad provided on the printed circuit board 43, resulting in shielding the electromagnetic waves.

The image sensor module 40 may be a device converting light incident through the lens assembly 10 into an electrical signal.

As an example, the image sensor module 40 may include an image sensor 41 and a printed circuit board 43 connected to the image sensor 41, and may further include an infrared filter.

The infrared filter may cut off light in an infrared region in the light incident through the lens assembly 10.

The image sensor 41 may convert the light incident through the lens assembly 10 into an electrical signal. As an example, the image sensor 41 may be a charge coupled device (CCD) or a complementary metal oxide semiconductor (CMOS).

The electrical signal converted by the image sensor 41 may be output as an image through a display unit 1060 of a portable electronic device 1000. The camera module 50 may be installed as a front camera of the portable electronic device 1000 along with the display unit 1060 or as a back camera on a side of the portable electronic device 1000 other than a side with the display unit 1060.

The image sensor 41 may be fixed to the printed circuit board 43, and may be electrically connected to the printed circuit board 43 by wire bonding.

Figure 2:
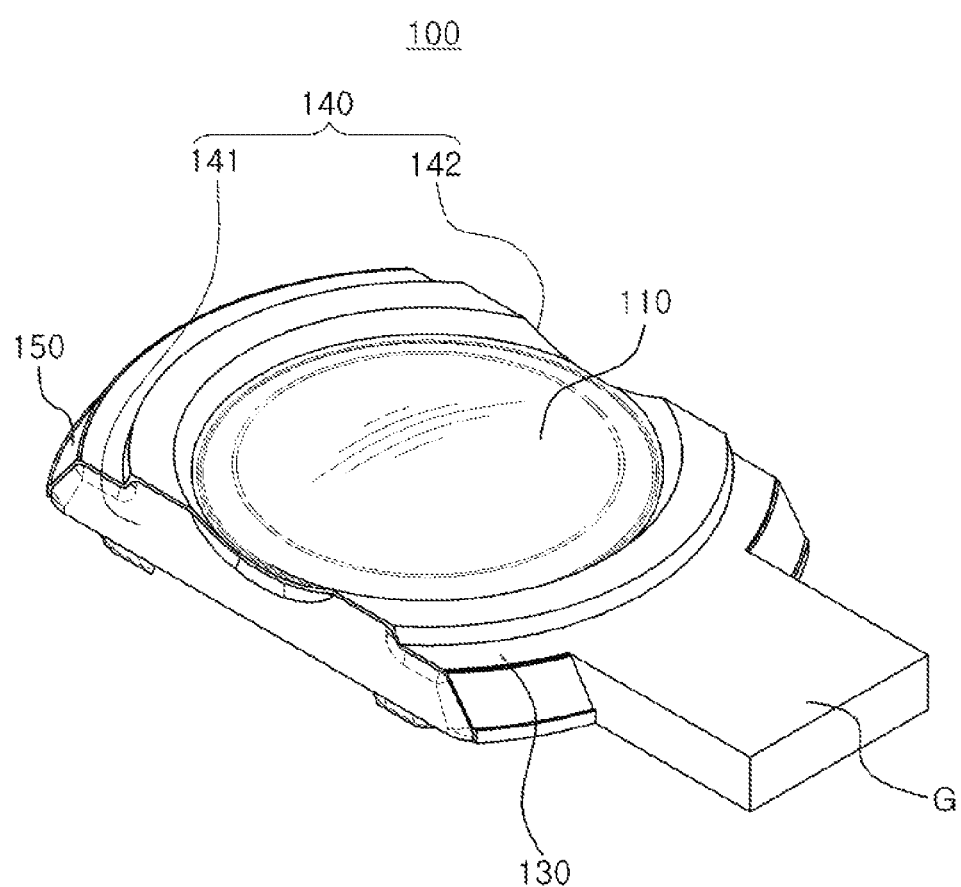
FIGS. 2 and 3 are perspective views for describing a lens of a lens assembly according to one or more embodiments.
Figure 3:
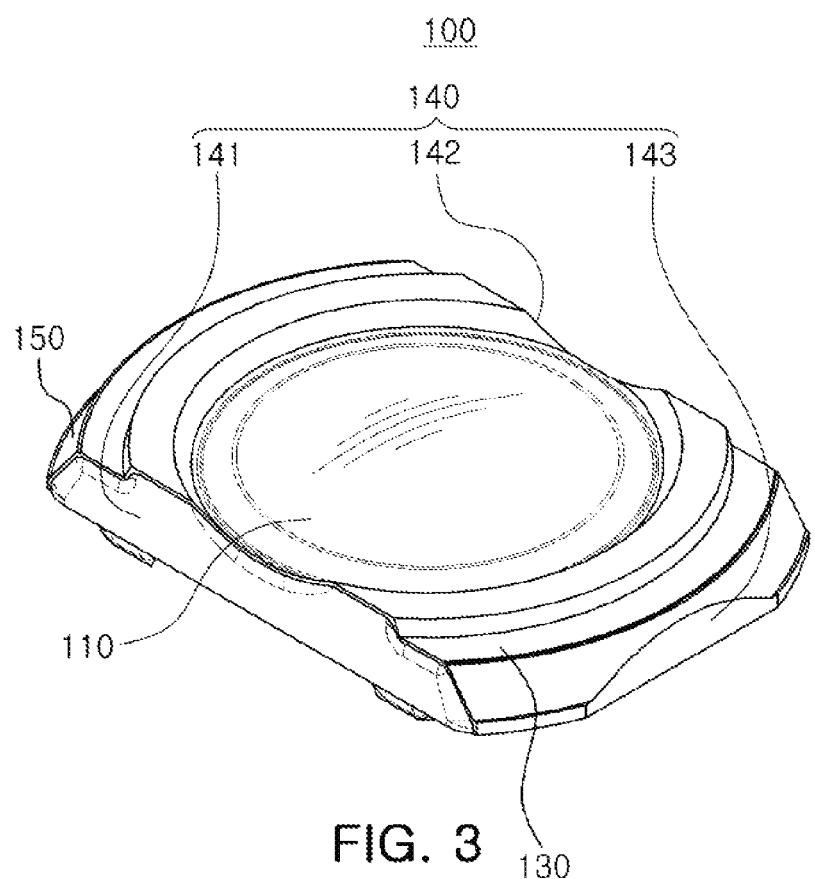

FIGS. 2 and 3 are perspective views for describing a lens of a lens assembly according to one or more embodiments.

The lens assembly 10 according to one or more embodiments may include a plurality of lens, but one lens will be described for convenience of explanation.

Referring to FIGS. 2 and 3, a lens 100 may include an optical portion 110 and a flange portion 130 formed at a periphery of at least a portion of the optical portion 110.

The optical portion 110 may be a portion in which optical performance of the lens 100 is exhibited. As an example, light reflected by a subject may be refracted while passing through the optical portion 110.

The optical portion 110 may have positive or negative refractive power, may have a spherical surface shape or an aspherical surface shape, and may have a concave, convex, or meniscus shape in a paraxial region (a portion on and adjacent to an optical axis).

The flange portion 130 may be a portion that fixes the lens 100 to another component, for example, the lens barrel 200 or another lens.

The flange portion 130 may be extended from a periphery of at least a portion of the optical portion 110 and may be formed integrally with the optical portion 110.

The lens 100 may be formed of plastic and may be injection-molded through a molding.

In general, in a case in which the lens 100 is injection-molded through the molding, a gate portion G may be formed at a portion corresponding to a passage through which a resin material is introduced (see FIG. 2). In order to remove the gate portion G, a portion of a side surface of the flange portion 130 of the lens 100 may be cut in the optical axis direction to thereby form a D-cut portion.

In this case, the optical portion 110 of the lens 100 may be generally formed in a circular shape, but the flange portion 130 may have a 'D' shape in which a portion thereof is removed. Hereinafter, a portion having the 'D' shape will be referred to as a D-cut portion. For reference, the meaning of 'cut' in the D-cut portion is not limited to the meaning of cutting or removal.

The flange portion 130 of at least one lens 100 of the lens assembly 10 according to one or more embodiments may include D-cut portions 140 and circular arc portions 150.

The D-cut portion 140 may mean a plane portion formed in the flange portion 130 and the circular arc portion 150 may mean a portion formed in a circular arc shape to connect the D-cut portions 140 to each other.

Here, the 'plane' does not mean only a perfect plane, but may be a meaning including tolerance at the time of manufacturing. Similarly, the 'circular arc' does not mean only a perfect circular arc, but may be a meaning including tolerance at the time of manufacturing.

The D-cut portions 140 may be formed in at least three regions of the flange portion 130. Two D-cut portions 140 may be formed at positions which are symmetrical with each other in relation to the optical axis and the remaining D-cut portion 143 may be formed at the circular arc portion 150. Here, the 'symmetry' does not mean only a perfect symmetry, but may be a meaning including tolerance at the time of manufacturing.

As an example, the D-cut portion 140 may include a first D-cut portion 141 and a second D-cut portion 142 which are symmetrical with each other in relation to the optical axis and may further include a third D-cut portion 143 formed at the circular arc portion 150.

The first D-cut portion 141 may be formed on one side surface of the flange portion 130 and the second D-cut portion 142 may be formed on the other side surface (a surface opposite to the one side surface) of the flange portion. The third D-cut portion 143 may be a surface formed by cutting at least a portion of the circular arc portion 150.

Referring to FIG. 2, in at least one lens 100 of the lens assembly 10, the gate portion G, which is a portion corresponding to the passage through which the resin material is introduced at the time of injection molding may be formed at the circular arc portion 150 of the flange portion 130.

Therefore, by removing the gate portion G after the injection molding, the third D-cut portion 143 in which a portion of the circular arc portion 150 of the flange portion 130 is removed may be formed (see FIG. 3).

The first D-cut portion 141 and the second D-cut portion 142 may be manufactured to have a 'D' shape at the time of injection molding, but the third D-cut portion 143 may be manufactured to have the 'D' shape by removing a portion of the circular arc portion 150 after the injection. Therefore, a plane of the first D-cut portion 141 and a plane of the second D-cut portion 142 may have surface roughness different from that of a plane of the third D-cut portion 143.

Since the first D-cut portion 141 and the second D-cut portion 142 are manufactured to have the 'D' shape at the time of injection, a length of a straight line passing through the optical axis of the lens 100 and connecting the first D-cut portion 141 and the second D-cut portion 142 to each other may be less than a length of a straight line passing through the optical axis of the lens 100 and connecting the circular arc portions 150 to each other.

In recent years, in accordance with the demand for miniaturization of the portable electronic device 1000, the lens assembly 10 and the camera module mounted on the portable electronic device 1000 are also required to be miniaturized. Further, it is required to improve performance of the lens assembly 10 and the camera module 50 separately from the necessity of miniaturization.

At least one lens 100 of the lens assembly 10 according to one or more embodiments includes the first D-cut portion 141 and the second D-cut portion 142 which are symmetrical with each other in relation to the optical axis, such that the optical performance of the lens may be secured and the lens 100 may be miniaturized, and the miniaturization and performance improvement of the camera module may also be implemented.

In one or more embodiments, the first D-cut portion 141 and the second D-cut portion 142 are not formed by removing the portion of the lens 100 after the injection molding unlike a general injection lens, but may be formed to have the 'D' shape at the time of injection.

In the case of a general injection lens, since a portion of the lens is removed after injection molding, the lens may be deformed by force applied to the lens in the process. In a case in which the lens is deformed, the optical performance of the lens may be inevitably changed.

That is, in a case in which the D-cut portions are formed to be symmetrical with each other in relation to the optical axis by removing a portion of the lens after injection-molding the lens, the lens may be miniaturized, but the performance of the lens may be deteriorated.

However, according to one or more embodiments as described herein, since the first D-cut portion 141 and the second D-cut portion 142 are formed on the flange portion 130 of the lens 100 at the time of injection, the lens 100 may be miniaturized and the performance of the lens 100 may be secured.

Figure 4:
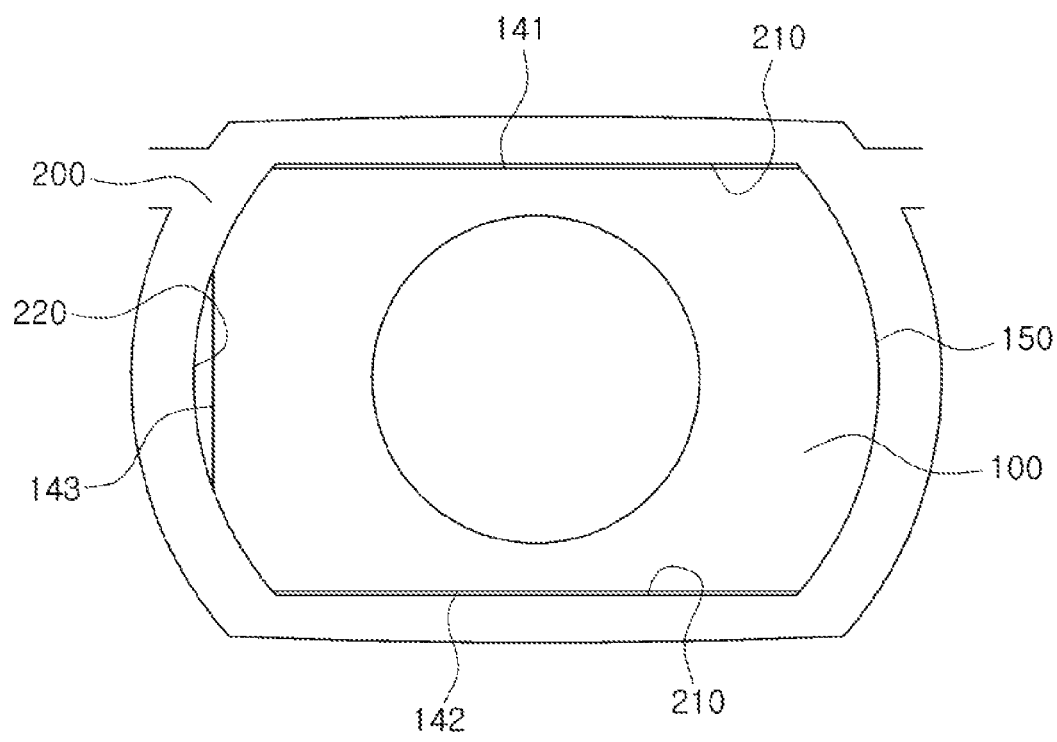
FIG. 4 is a plan view illustrating a figure in which a lens of a lens assembly and a lens barrel are coupled to each other according to one or more embodiments.
Figure 5:
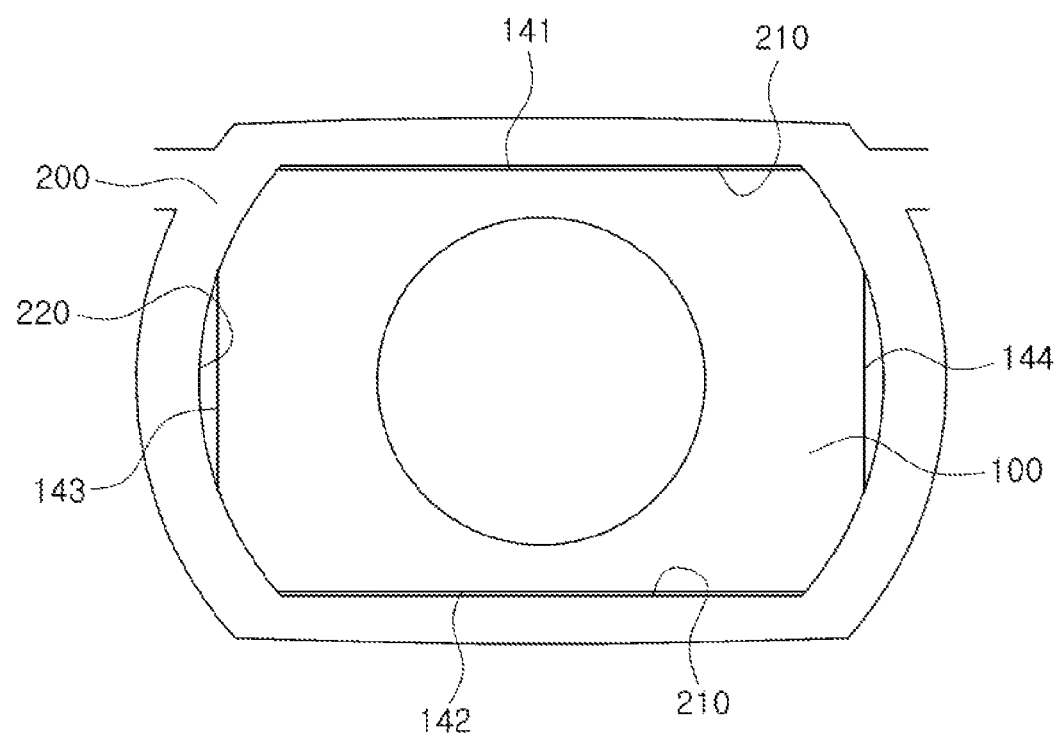
FIG. 5 is a plan view illustrating a figure in which a lens of a lens assembly and a lens barrel are coupled to each other according to one or more embodiments.

FIG. 4 is a plan view illustrating a figure in which a lens of a lens assembly and a lens barrel according to one or more embodiments are coupled to each other and FIG. 5 is a plan view illustrating a figure in which a lens of a lens assembly and a lens barrel according to one or more other embodiments are coupled to each other.

Referring to FIGS. 4 and 5, the lens barrel 200 may have a shape that is substantially similar to the lens 100.

The lens barrel 200 may include D-cut portions 210 and circular arc portions 220 formed on an inner surface and an outer surface.

The D-cut portion 210 of the lens barrel 200 may be formed at positions corresponding to the D-cut portions 140 of the lens 100, which are symmetrical with each other in relation to the optical axis. As an example, the D-cut portions 210 may be formed at the positions corresponding to the first D-cut portion 141 and the second D-cut portion 142 of the lens 100 on the inner surface and the outer surface of the lens barrel 200.

The D-cut portions 210 of the lens barrel 200 may mean plane portions formed on the inner surface and the outer surface of the lens barrel 200, similarly to the D-cut portions 140 of the lens 100. Here, the 'plane' does not refer only to a perfect plane, but may also include tolerance at the time of manufacturing.

In addition, the circular arc portions 220 of the lens barrel 200 may be formed at positions corresponding to the circular arc portions 150 of the lens 100. As an example, the circular arc portions 220 may be formed at the positions corresponding to the circular arc portions 150 of the lens 100 on the inner surface and the outer surface of the lens barrel 200.

The circular arc portions 220 of the lens barrel 200 may mean circular arc-shaped portions formed on the inner surface and the outer surface of the lens barrel 200, similarly to the circular arc portions 150 of the lens 100. Here, the 'circular arc' does not mean only a perfect circular arc, but may also include a meaning including tolerance at the time of manufacturing.

In the present embodiment, the lens barrel 200 and the lens 100 may be configured so that at least three surfaces are in contact with each other. The D-cut portions 140 of the lens 100 may be configured to be in non-contact with the lens barrel 200, and the circular arc portions 150 of the lens 100 may be configured to be in contact with the lens barrel 200. As an example, the D-cut portions 210 of the lens barrel 200 and the D-cut portions 140 of the lens 100 may be disposed to be spaced apart from each other in a direction perpendicular to the optical axis, and the circular arc portions 220 of the lens barrel 200 and the circular arc portions 150 of the lens 100 may be disposed so that at least three surfaces are in contact with each other.

The lens barrel 200 and the lens 100 are manufactured by an injection process, and since the lens barrel 200 and the lens 100 are not easily manufactured precisely to predetermined dimensions in design, a certain range of error may be involved.

[For example, the circular arc portions 220 of the lens barrel 200 and the circular arc portions 150 of the lens 100 may not actually be a perfect circular arc shape, but may be injection-molded so as to be close to the circular arc shape. Therefore, the circular arc portions 220 of the lens barrel 200 and the circular arc portions 150 of the lens 100 may have better roundness.

Here, the roundness may mean the degree of how close a shape of a processing circle is to a shape of a real circle (ideal round circle), and good roundness may mean that the shape of the processing circle is close to a real circle.

Meanwhile, the roundness of the circular arc portions 220 of the lens barrel 200 and the roundness of the circular arc portions 150 of the lens 100 may be different from each other. Therefore, when the lens 100 is inserted into the lens barrel 200, there may be a difference in force applied to one portion and the other portion of the lens 100 due to a difference in roundness between the lens barrel 200 and the lens 100.

For example, when the lens 100 is inserted into the lens barrel 200, there is a deviation in force applied to the circular arc portions 150 of the lens 100, resulting in asymmetrically deforming the lens 100.

When the lens 100 is inserted into the lens barrel 200, since the force is applied to the lens 100 by a contact between the lens barrel 200 and the lens 100, the lens 100 may be finely deformed. In this case, in a case in which the lens 100 is uniformly deformed as a whole, since the optical performance of the lens 100 is uniformly deformed as a whole, the lens 100 may be manufactured in consideration of such error in a process of design.

However, in a case in which the lens 100 is asymmetrically deformed, there is a problem that it is difficult to predict how the optical performance of the lens 100 is deformed after coupling the lens 100 to the lens barrel 200.

In particular, in a case in which the lens barrel 200 and the lens 100 are brought into two-surface contact, a difference in the optical performance may occur between one side and the other side of the lens 100.

However, in the lens assembly 10 according to the present examples, since the lens barrel 200 and the lens 100 are configured so that at least three surfaces are in contact with each other, the deviation in the force applied to the lens 100 according to the difference in the roundness may be significantly reduced. Accordingly, the asymmetrical deformation of the optical performance of the lens 100 may be prevented.

Referring to FIG. 4, the first D-cut portion 141, the second D-cut portion 142, the third D-cut portion 143, and the circular arc portions 150 may be formed in the lens 100, and the D-cut portions 210 and the circular arc portions 220 may also be formed in the lens barrel 200.

The circular arc portions 220 of the lens barrel 200 and the circular arc portions 150 of the lens 100 may be configured so that three surfaces are in contact with each other.

Referring to FIG. 5, the first D-cut portion 141, the second D-cut portion 142, the third D-cut portion 143, a fourth D-cut portion 144, and the circular arc portions 150 may be formed in the lens 100, and the D-cut portions 210 and the circular arc portions 220 may also be formed in the lens barrel 200.

The circular arc portions 220 of the lens barrel 200 and the circular arc portions 150 of the lens 100 may be configured so that four surfaces are in contact with each other.

The lens barrel 200 and the lens 100 are illustrated in the embodiments of FIGS. 4 and 5 so that the three surfaces or the four surfaces are in contact with each other, but are not limited thereto, and may also be configured so that five or more surfaces are in contact with each other. However, also in this case, the D-cut portions 140 of the lens 100 and the D-cut portions 210 of the lens barrel 200 may be configured to be spaced apart from each other.

Figure 6:
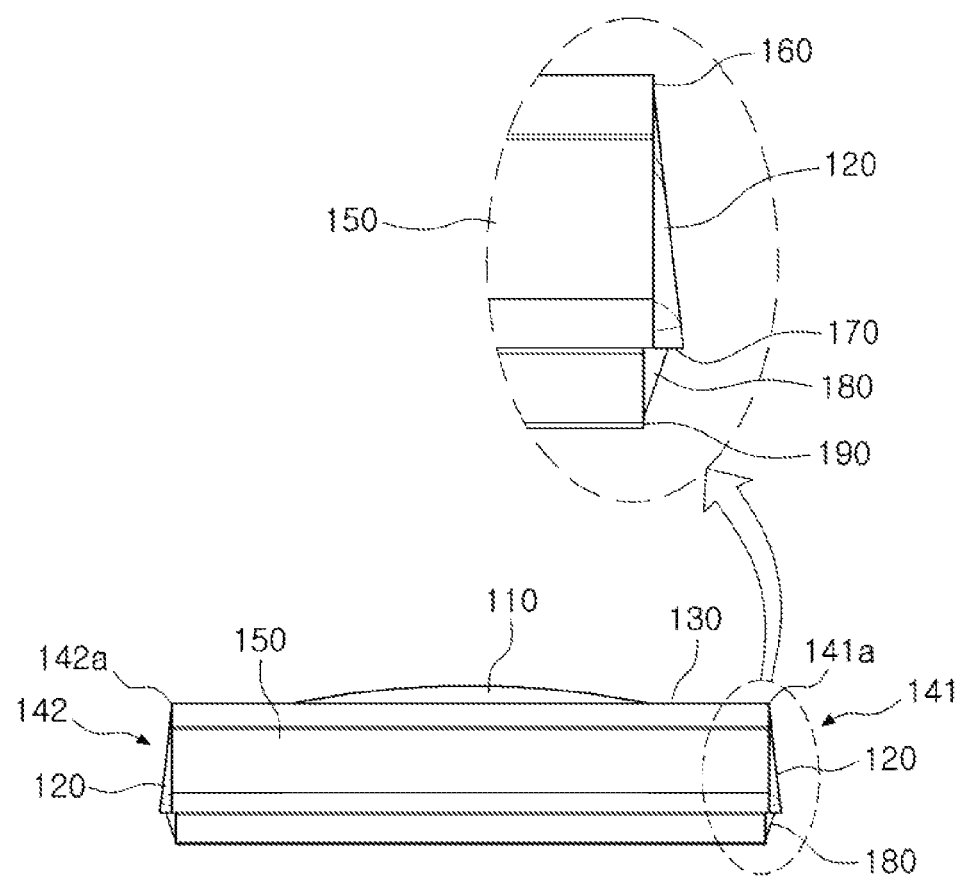
FIGS. 6 and 7 are side views of a lens of a lens assembly according to one or more embodiments.
Figure 7:
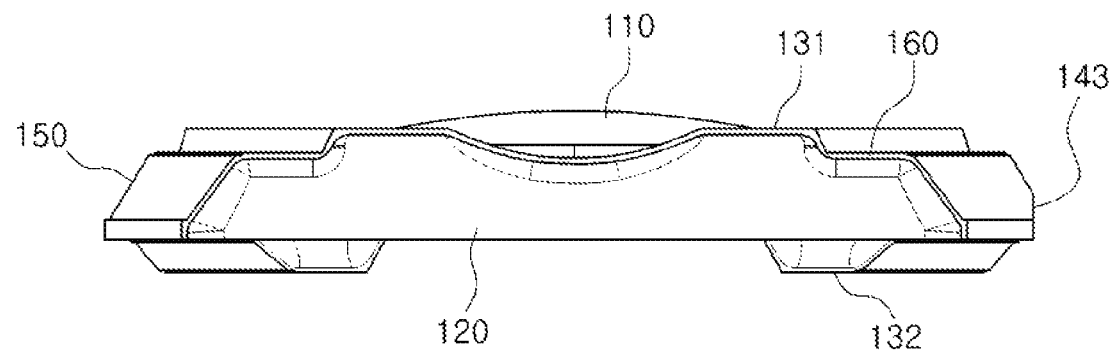
Figure 8:
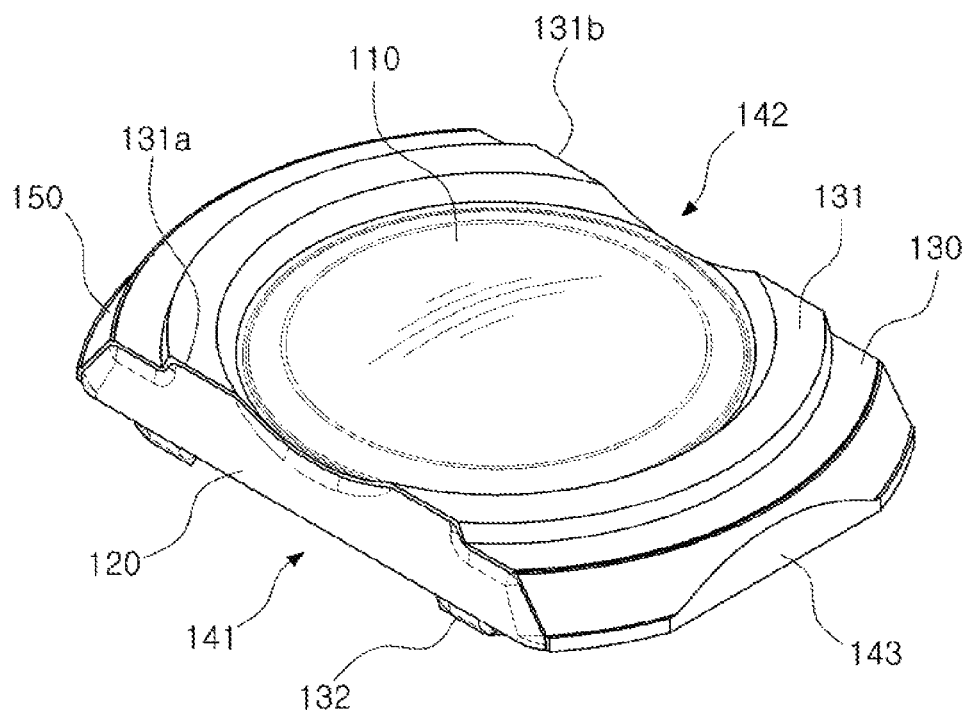
FIGS. 8 and 9 are perspective views of a lens of a lens assembly according to one or more embodiments.
Figure 9:
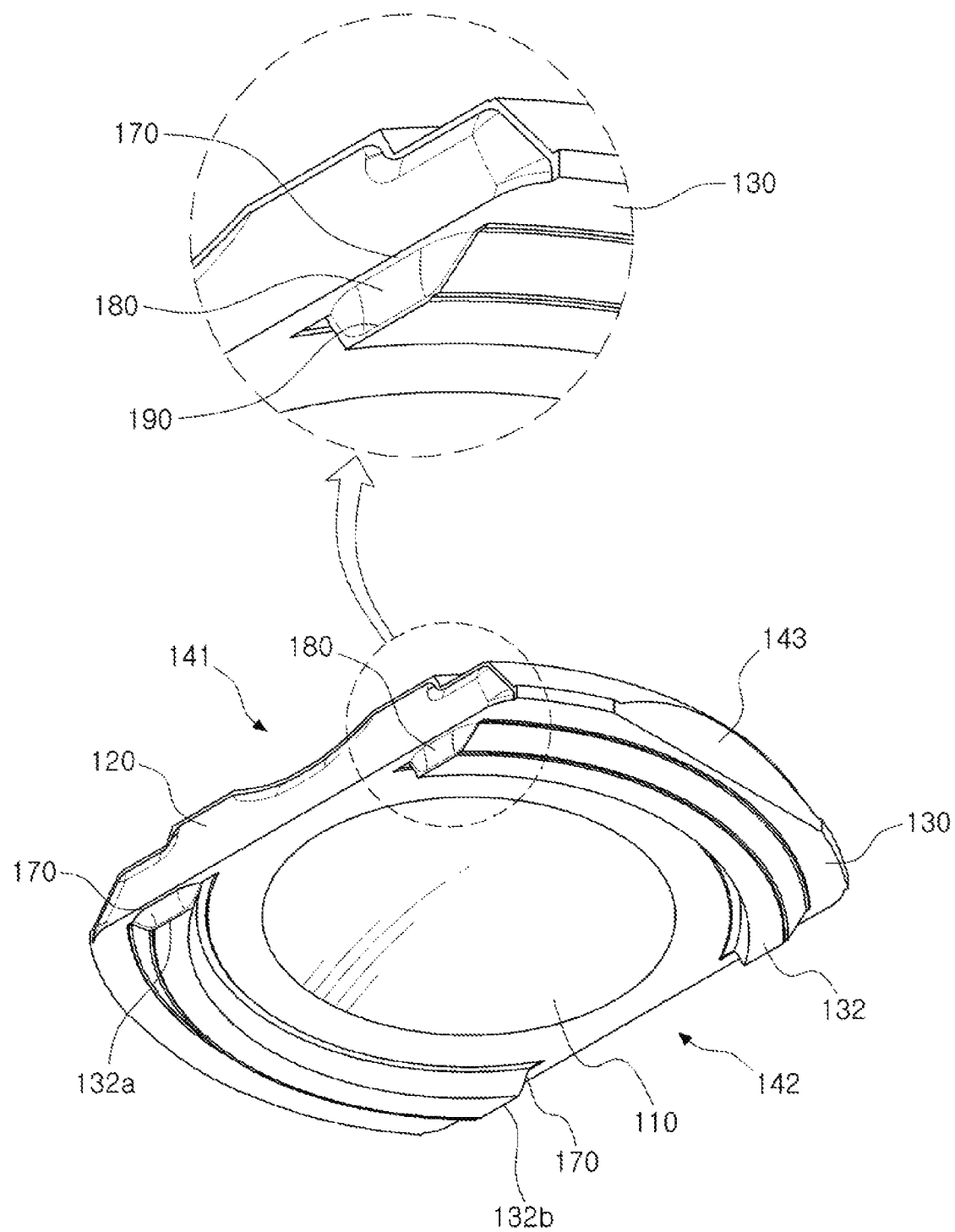

FIGS. 6 and 7 are side views of the lens of the lens assembly according to one or more embodiments and FIGS. 8 and 9 are perspective views of the lens of the lens assembly according to one or more embodiments.

Referring first to FIG. 6, the D-cut portions 140 of the lens 100 may include an inclined surface. As an example, a first inclined surface 120 may be provided to each of the first D-cut portion 141 and the second D-cut portion 142. The first inclined surface 120 may easily separate the mold from the manufactured lens 100.

The first inclined surface 120 may be spaced apart from ends of the D-cut portions 140 by a predetermined interval.

As an example, an end 141a of the first D-cut portion 141 and the first inclined surface 120 may be spaced apart from each other in an optical axis direction, and an end 142a of the second D-cut portion 142 and the first inclined surface 120 may also be spaced apart from each other in an optical axis direction.

A planarized surface 160 may be formed between the end 141a of the first D-cut portion 141 and the first inclined surface 120. In addition, the planarized surface 160 may also be formed between the end 142a of the second D-cut portion 142 and the first inclined surface 120. The planarized surface 160 may be a surface formed in the optical axis direction.

That is, the first D-cut portion 141 and the second D-cut portion 142 may include the planarized surfaces 160 as boundary areas that separate the remaining surface (e.g., the first inclined surface 120) of the first D-cut portion 141 and the second D-cut portion 142 from the end 141a of the first D-cut portion 141 and the end 142a of the second D-cut portion 142. The planarized surface 160 may be a plane ribbon that is continuously connected.

In one or more embodiments, molds forming the optical portion 110 and the D-cut portion 140 may be different from each other. That is, the mold forming the optical portion 110 and the mold forming the D-cut portions 140 may be coupled to each other to thereby manufacture the lens 100 including the optical portion 110 and the D-cut portions 140.

For example, in order to manufacture the lens 100 according to the present embodiments, at least four molds may be used. That is, a first movable side mold (not shown) for forming a portion of the flange portion 130 corresponding to one surface (e.g., an object side surface) of the lens 100 and the optical portion 110, a first fixed side mold (not shown) for forming a portion of the flange portion 130 corresponding to the other surface (e.g., an upper side surface) of the lens 100 and the optical portion 110, a second movable side mold (not shown) for forming the first D-cut portion 141 and the second D-cut portion 142 of the lens 100, and a second fixed side mold (not shown) for forming the first D-cut portion 141 and the second D-cut portion 142 of the lens 100 may be used.

Here, when the molds (the first movable side mold and the first fixed side mold) for forming the optical portion 110 and the molds (the second movable side mold and the second fixed side mold) for forming the D-cut portions 140 are coupled to each other, a coupling position between molds may be slightly changed by design error and/or manufacturing error.

Defects may occur in the lens manufactured by such design error and/or manufacturing error.

For example, the first inclined surfaces 120 may protrude from the ends 141a and 142a of the D-cut portions 140 due to the change in the coupling position between the molds, and such burrs may have an influence on the optical portion 110 of the lens 100 to change the optical performance, or may have an influence on the flange portion 130 to disable a coupling with the lens barrel 200 or other lenses.

Therefore, in the present embodiments, in order to prevent the defects from occurring in the lens 100 by the design error and/or the manufacturing error, the first inclined surfaces 120 may be always spaced apart from the end 141a of the first D-cut portion 141 and the end 142a of the second D-cut portion 142 by a predetermined interval. Accordingly, even if the design error and/or the manufacturing error occurs, the first inclined surfaces 120 may be prevented from protruding on the end 141a of the first D-cut portion 141 and end 142a of the second D-cut portion 142.

Meanwhile, referring to FIGS. 7 through 9, a first rib 131 that protrudes for coupling with another lens or the lens barrel 200 or maintaining an interval with another lens or the lens barrel 200 may be disposed on the flange portion 130 of one surface (e.g., an object side surface) of the lens 100.

The first rib 131 may be formed on the flange portion 130 along a periphery of the optical portion 110, and both end surfaces 131a and 131b of the first rib 131 may be connected to the first D-cut portion 141 and the second D-cut portion 142. That is, both end surfaces 131a and 131b of the first rib 131 may configure portions of the first D-cut portion 141 and the second D-cut portion 142.

In addition, a second rib 132 that protrudes for coupling with another lens or the lens barrel 200 or maintaining an interval with another lens or the lens barrel 200 may also be disposed on the flange portion 130 of the other surface (e.g., an image side surface) of the lens 100.

The second rib 132 may be formed on the flange portion 130 along a periphery of the optical portion 110, and both end surfaces 132a and 132b of the second rib 131 may not be connected to the first D-cut portion 141 and the second D-cut portion 142.

For example, the end surface 132a of one side of the second rib 132 may be spaced apart from the first D-cut portion 141 by a predetermined interval in a direction perpendicular to the optical axis direction, and the end surface 132b of the other side of the second rib 132 may be spaced apart from the second D-cut portion 142 by a predetermined interval in a direction perpendicular to the optical axis direction.

Since the mold (the second fixed side mold) forming both end surfaces 132a and 132b of the second rib 132 and the mold (the second movable side mold) forming the D-cut portions 140 are different molds, both end surfaces 132a and 132b of the second rib 132 may protrude from the D-cut portions 140 by the design error and/or the manufacturing error, thereby forming the burrs.

Therefore, in the present embodiments, the end surface 132a of one side of the second rib 132 may always be spaced apart from the first D-cut portion 141 by the predetermined interval, and the end surface 132b of the other side of the second rib 132 may always be spaced apart from the second D-cut portion 142 by the predetermined interval.

The planarized surface 170 may be formed between the end 132a of one side of the second rib 132 and the first D-cut portion 141. In addition, the planarized surface 170 may also be formed between the end 132b of the other side of the second rib 132 and the second D-cut portion 142. The planarized surface 170 may be a surface formed in a direction perpendicular to the optical axis direction.

Both end surfaces 132a and 132b of the second rib 132 may include inclined surfaces. As an example, second inclined surfaces 180 may be provided to both end surfaces 132a and 132b of the second rib. The second inclined surface 180 may easily separate the mold from the manufactured lens 100. Meanwhile, the first inclined surface 120 and the second inclined surface 180 may have inclined directions opposite to each other (see FIG. 6).

Since the mold (the second fixed side mold) forming both end surfaces 132a and 132b of the second rib 132 and the mold (the first fixed side mold) forming the remaining portions of the second rib 132 are different molds, the second inclined surfaces 180 may protrude from the ends of the second rib 132 by the design error and/or the manufacturing error, thereby forming the burrs.

Therefore, in the present embodiments, in order to prevent defects from occurring in the lens by the design error and/or the manufacturing error, the second inclined surfaces 180 may always be spaced apart from ends of the second rib 132 by the predetermined interval in the optical axis direction. Accordingly, even if the design error and/or the manufacturing error occurs, the second inclined surfaces 180 may be prevented from protruding from the ends of the second rib 132.

A planarized surface 190 may be formed between the end of the second rib 132 and the second inclined surface 180.

Figure 10:
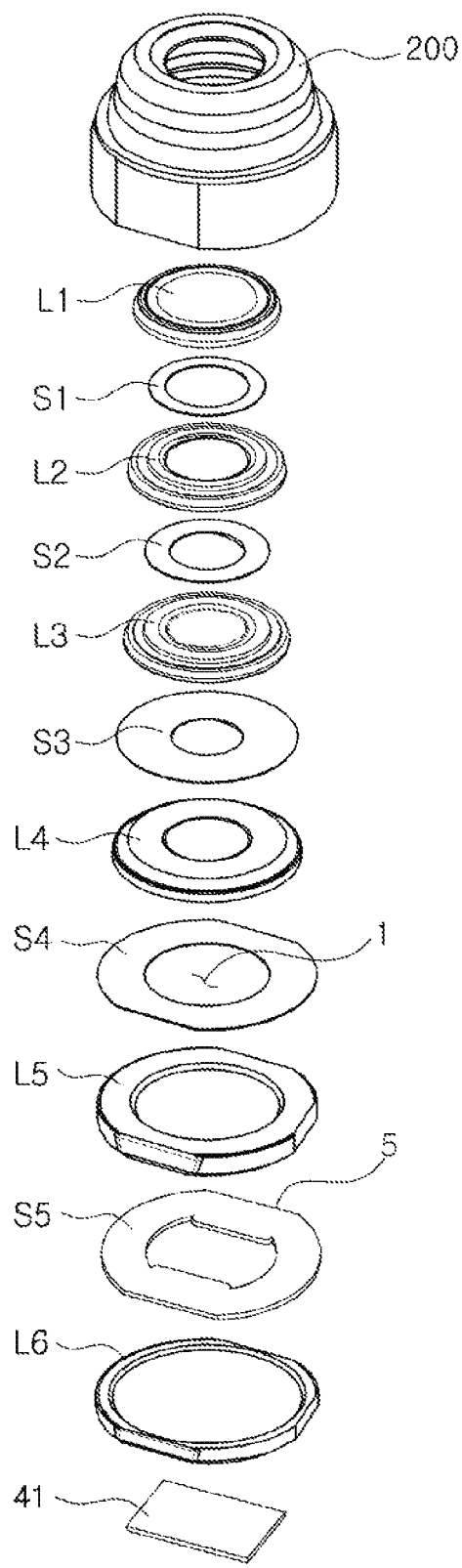
FIG. 10 is an exploded perspective view of a lens assembly according to one or more embodiments.
Figure 11:
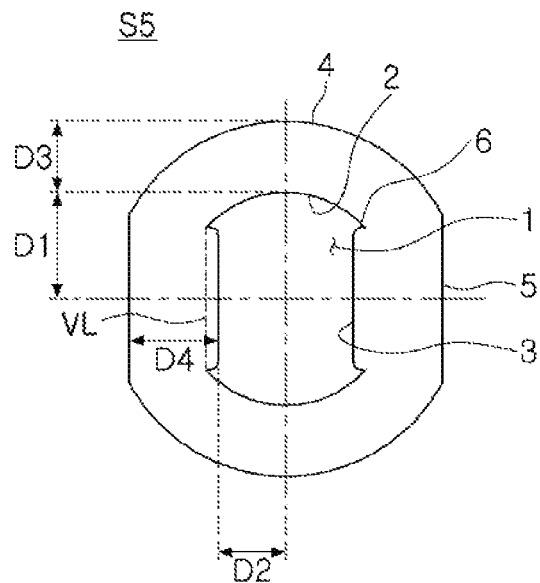
FIGS. 11, 12, 13, 14, and 15 are plan views illustrating one or more embodiments of a spacer of a lens assembly according to one or more embodiments.

FIG. 10 is an exploded perspective view of the lens assembly according to one or more embodiments.

Referring to FIG. 10, the lens assembly 10 may include a lens barrel 200 and a plurality of lenses.

The plurality of lenses may include a first lens L1, a second lens L2, a third lens L3, a fourth lens L4, a fifth lens L5, and a sixth lens L6 that are arranged from an object side to an image side (an image sensor 41 side). However, the plurality of lenses are not limited thereto, and may include five or less, or seven or more lenses, if necessary.

Spacers may be provided between the lenses adjacent to each other. The spacers may maintain intervals between the lenses and may cut off unnecessary light. The spacers may include a first spacer S1, a second spacer S2, a third spacer S3, a fourth spacer S4, and a fifth spacer S5 that are arranged from the object side to the image side (the image sensor 41 side).

An incident hole 1 through which light passes may be formed in a central portion of each of the spacers. Light reflected by a subject may be refracted by the plurality of lenses and may be incident on the image sensor 41 through the incident holes 1 of the spacers.

The spacers may be formed of a metal, and a light absorbing layer may be provided on an outer surface of the spacers to prevent unwanted light from being incident on the image sensor 41. The light absorbing layer may be a black film or black iron oxide.

Among the plurality of lenses, two lenses L5 and L6 disposed to be close to the image side may be the lenses (see the lenses of FIGS. 2 through 9) including the D-cut portions 140 and the circular arc portions 150, and four lenses L1, L2, L3, and L4 disposed to be close to the object side may be the circular lenses.

That is, a shape of the two lenses L5 and L6 disposed to be close to the image side and a shape of the four lenses L1, L2, L3, and L4 disposed to be close to the object side may be different from each other.

Since the four lenses L1, L2, L3, and L4 disposed to be close to the object side may be injection-molded, the D-cut portion may be formed at a portion of the lens by removing the gate portion, which is a passage through which the resin material is introduced, but the four lenses L1, L2, L3, and L4 disposed to be close to the object side may be substantially the circular lenses.

The lens barrel 200 may include the D-cut portions 210 at portions on which the two lenses (for example, the fifth lens L5 and the sixth lens L6) disposed to be close to the image side are disposed. The inner surface and the outer surface of the lens barrel 200 may be a plane surface in the portions at which the D-cut portions 210 are formed.

In addition, at least one of the spacers may include a D-cut portion 5 corresponding to the D-cut portion 140 of the lens and the D-cut portion 210 of the lens barrel 200.

The lens assembly 10 used in the portable electronic device 1000 may generally have a short through-the-lens (TTL) distance for miniaturization. Here, TTL is a distance from an object side surface of the first lens L1 to an imaging surface of the image sensor 41.

Instead of shortening the TTL, a diameter of the optical portion 110 becomes larger as the plurality of lenses are closer to the image side in order to secure the optical performance.

In the lens assembly 10 according to embodiments in the present disclosure, the D-cut portions 140 may be formed symmetrically in relation to the optical axis on the two lenses (for example, the fifth lens L5 and the sixth lens L6) disposed to be close to the image side, the D-cut portions 210 may be formed on the lens barrel 200 at the positions corresponding to the D-cut portions 140 of the lenses, and the D-cut portion 5 may be formed on the spacer, such that an overall size of the lens assembly 10 may be reduced and the camera module may thus be miniaturized.

The spacers S1, S2, and S3 disposed between the four lenses L1, L2, L3, and L4 disposed to be close to the object side may have a substantially circular shape.

The spacers S4 and S5 which are disposed between the fourth and fifth lenses L4 and L5 and between the two lenses L5 and L6 disposed to be close to the image side, respectively, may be spacers on which the D-cut portion 5 is formed. As an example, the D-cut portion 5 may be formed at a position corresponding to the D-cut portion 140 of the lenses on an outer side surface of the spacers.

FIGS. 11 through 15 are plan views illustrating a spacer of the lens assembly according to one or more embodiments.

Light reflected from the subject and incident into the lens barrel 200 may be refracted while passing through the plurality of lenses. In this case, the refracted light may be unintentionally reflected from the inner surface of the lens barrel 200, and in a case in which the reflected light is incident on the image sensor 41, a flare phenomenon may occur.

In a case in which the flare phenomenon occurs, quality of the captured image may be deteriorated, such as a portion of the captured image is blurred or a round white spot appears.

In particular, the size of each component of the lens assembly 10 is reduced according to a miniaturization trend, and accordingly, unintended reflections of light may occur in the lens barrel 200 (for example, from an inner surface of the lens barrel 200).

For example, in a case in which an overall shape of the lens barrel is a cylindrical shape, even though the light is reflected from the inner surface of the lens barrel, the reflected light is less likely to cause the flare phenomenon.

In general, since a plane shape of the lens barrel is the circular shape and a plane shape of the image sensor is a quadrangular shape, a diameter of the lens barrel may be greater than a diagonal length of the image sensor.

Therefore, since a certain interval (in the optical axis direction and the direction perpendicular to the optical axis) is formed between the inner surface of the lens barrel and the image sensor, the reflected light may not be incident on the image sensor even though the light is reflected from the inner surface of the lens barrel in the case in which the lens barrel has a substantially cylindrical shape. As a result, the reflected light is less likely to cause the flare phenomenon.

However, in a case in which the size of the lens barrel 200 is reduced by providing the D-cut portion 210 on the portion of the lens barrel 200 as in the present embodiments, the interval between the lens barrel 200 and the image sensor (in the optical axis direction and the direction perpendicular to the optical axis) is narrowed by the reduced size of the lens barrel 200.

Therefore, in the case in which the light is reflected in the lens barrel 200, the reflected light is incident on the image sensor 41 and the flare phenomenon is highly likely to occur. That is, even though miniaturization of the lens assembly 10 and the camera module may be achieved, a problem in the performance thereof may occur.

The lens assembly 10 according to one or more embodiments in the present disclosure may prevent the light from being reflected in the lens barrel 200, thereby preventing the occurrence of the flare phenomenon.

The spacer in contact with at least one lens of the plurality of lenses may include a transmission portion 6 through which the light passes and a blocking portion 3 blocking unnecessary light.

As an example, a first curved portion 2 and the blocking portion 3 may be formed on an inner side surface of the fifth spacer S5. Here, a surface of the fifth spacer S5 in which the incident hole 1 of the fifth spacer S5 is formed is referred to as the inner side surface of the fifth spacer S5. In addition, the description is made based on the fifth spacer S5 for convenience of explanation, but the fourth spacer S4 may be formed in a manner similar to the fifth spacer S5.

A pair of first curved portions 2 may be formed to face each other with relation to the optical axis, and similarly, a pair of blocking portions 3 may be formed to face each other with relation to the optical axis.

The first curved portion 2 may have a shape corresponding to the shape of the circular arc portion 150 of the lens 100, and the blocking portion 3 may have a shape corresponding to the shape of the D-cut portion 140 of the lens 100.

The D-cut portion 5 corresponding to the blocking portion 3 and a second curved portion 4 corresponding to the first curved portion 2 may be formed on an outer side surface of the fifth spacer S5.

The first curved portion 2 formed on the inner side surface of the fifth spacer S5 may have a shape substantially concentric with the second curved portion 4 formed on the outer side surface of the fifth spacer S5.

The blocking portion 3 formed on the inner side surface of the fifth spacer S5 may have a shape substantially similar to the D-cut portion 5 formed on the outer side surface of the fifth spacer S5. That is, the blocking portion 3 may refer to a plane portion formed on the fifth spacer S5 similarly to the D-cut portion 5.

Here, a length (D2×2) of a straight line passing through the optical axis and connecting between the blocking portions 3 may be shorter than a length (D1×2) of a straight line passing through the optical axis and connecting the first curved portions 2.

The shortest distance D4 between the D-cut portion 5 and the blocking portion 3 may be longer than the shortest distance D3 between the first curved portion 2 and the second curved portion 4.

The shortest distance D2 between the blocking portion 3 and the optical axis may be shorter than the shortest distance D4 between the D-cut portion 5 and the blocking portion 3.

That is, the blocking portion 3 may have a shape protruding to the optical axis. Accordingly, the blocking portion 3 may block at least a portion of the light directed toward the inner surface of the lens barrel 200.

The lens barrel 200 may include a circular arc portion 220 and a D-cut portion 210. Since a certain interval (in the direction perpendicular to the optical axis) is secured between the circular arc portion 220 of the lens barrel 200 and the image sensor 41, an occurrence possibility of the flare phenomenon is relatively low. However, the interval (in the direction perpendicular to the optical axis) between the D-cut portion 210 of the lens barrel 200 and the image sensor 41 is narrow. As a result, when the light is reflected from the D-cut portion 210 of the lens barrel 200, there is a risk that the reflected light is incident on the image sensor 41 to cause the flare phenomenon.

Therefore, the fifth spacer S5, in contact with the lens 100 disposed on the D-cut portion 210 of the lens barrel 200, may include the blocking portion 3 formed on the inner side surface thereof so as to prevent the light from being reflected from the D-cut portion 210 of the lens barrel 200. That is, the blocking portion 3 may serve to block a path of the light directed toward the D-cut portion 210 of the lens barrel 200. Accordingly, the reflection of the light from the D-cut portion 210 of the lens barrel 200 may be prevented.

Meanwhile, a portion of the light is blocked by the blocking portion 3 of the fifth spacer S5, which may block light to be incident on the image sensor 41.

For example, long sides of the image sensor 41 having a rectangular shape are disposed to correspond to the D-cut portion 140 of the lens 100, the D-cut portion 210 of the lens barrel 200, and the D-cut portion 5 of the spacer S5. In this case, light directed toward corners of the image sensor 41 may be blocked by the blocking portion 3 of the fifth spacer S5. In this case, since the light that is incident on the image sensor 41 and is to form an image is blocked, a vignetting phenomenon in which corner regions of the captured image are darkened may occur.

In order to prevent the vignetting phenomenon, the transmission portions 6 may be formed at both ends of the blocking portion 3 in a length direction thereof. The transmission portions 6 may be disposed to correspond to the corner regions of the image sensor 41. Here, both ends of the blocking portions 3 in the length direction thereof may refer to locations in which the first curved portion 2 and the blocking portion 3 are connected.

The transmission portions 6 may refer to spaces through which light may pass at the locations in which the first curved portion 2 and the blocking portion 3 are connected.

The blocking portions 3 may be disposed to be closer to the optical axis than a virtual straight line VL connecting both ends of the pair of first curved portions 2 opposing each other.

The inner side surface of the fifth spacer S5 connected to both ends of the blocking portions 3 in the length direction thereof may have a shape depressed inwardly from the blocking portions 3. The blocking portions 3 and the first curved portions 2 may be discontinuously connected to each other.

That is, the blocking portions 3 may protrude toward the optical axis at the locations in which the first curved portions 2 and the blocking portions 3 are connected so that the spaces through which light may pass may be formed between the blocking portions 3 and the first curved portions 2, and the spaces may serve as the transmission portions 6.

Therefore, since the transmission portions 6 may prevent the light directed toward the corner sides of the image sensor 41 from being blocked, an occurrence of the vignetting phenomenon may be prevented.

Figure 12:
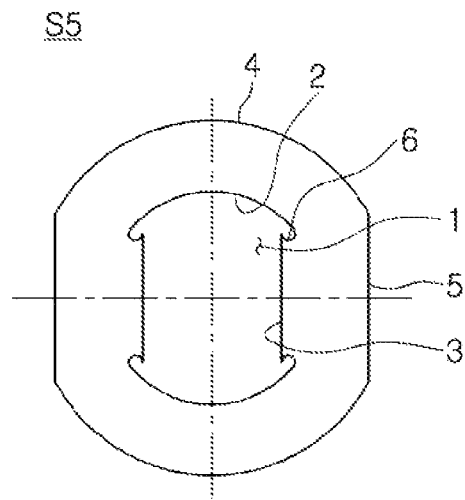
Figure 13:
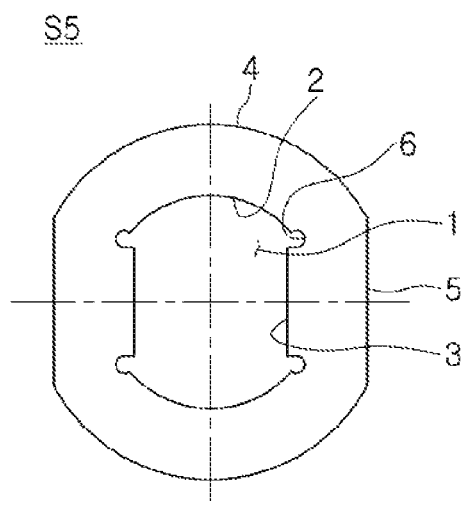
Figure 14:
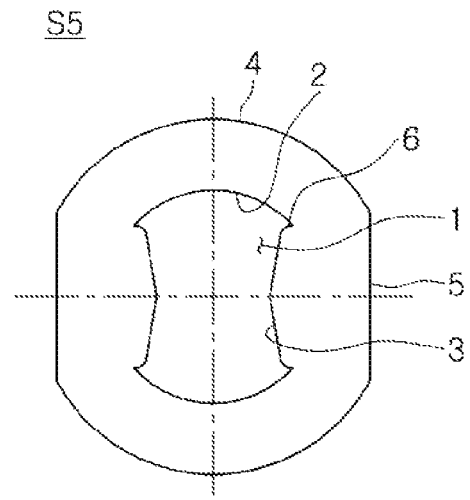
Figure 15:
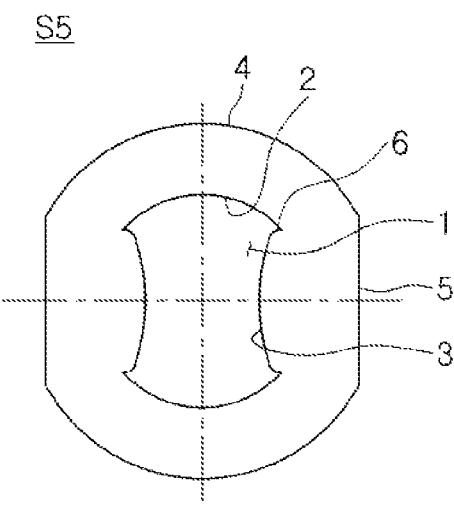

Both end surfaces of the blocking portions 3 may be formed to be convex curved surfaces (FIGS. 11, 14, and 15) or concave curved surfaces (FIGS. 12 and 13).

Meanwhile, according to one or more embodiments, the blocking portion 3 may have a shape in which a central portion thereof protrudes most. For example, referring to FIG. 14, the blocking portion 3 may be formed to be inclined such that the central portion thereof protrudes further toward the optical axis. In addition, referring to FIG. 15, the blocking portion 3 may be formed in a curved surface such that the central portion thereof protrudes further toward the optical axis.

Therefore, the lens assembly 10 according to the one or more embodiments described in the present disclosure may secure a performance while miniaturizing a size thereof, and as a result, may prevent a quality of the captured image from being deteriorated.

As set forth above, according to the one or more embodiments described in the present disclosure, the lens assembly and the camera module including the same may reduce the size of the lens assembly while securing the performance of the lens assembly.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
   a lens comprising:
      an optical portion configured to refract light; and
      a flange portion extending along a periphery of at least a portion of the optical portion;
   a spacer in contact with the lens and comprising an incident hole through which the light passes; and
   a lens barrel accommodating the lens and the spacer,
   wherein the lens further comprises:
      a first D-cut portion and a second D-cut portion formed on a side surface and another side surface of the flange portion in a state of non-contact with the lens barrel, and
      circular arc portions connecting the first D-cut portion and the second D-cut portion to each other, and
   the spacer comprises:
      blocking portions having a shape corresponding to a shape of the first D-cut portion and the second D-cut portion and first curved portions having a shape corresponding to a shape of the circular arc portions formed on an inner side surface, and
      transmission portions, comprising spaces through which the light passes, formed at locations in which the blocking portions and the first curved portions are connected to each other.

2. The lens assembly of claim 1, wherein the transmission portions are positioned to correspond to corner regions of an image sensor.

3. The lens assembly of claim 1, wherein a straight line distance passing through an optical axis between the blocking portions is shorter than a straight line distance passing through the optical axis between the first curved portions.

4. The lens assembly of claim 1, wherein the spacer further comprises D-cut portions corresponding to the blocking portions and second curved portions corresponding to the first curved portions on an outer side surface.

5. The lens assembly of claim 4, wherein a shortest distance between each D-cut portion and the corresponding blocking portion is longer than a shortest distance between each first curved portion and the corresponding second curved portion.

6. The lens assembly of claim 4, wherein a shortest distance between each blocking portion and an optical axis is shorter than a shortest distance between each D-cut portion and the corresponding blocking portion.

7. The lens assembly of claim 1, wherein the blocking portions protrude toward an optical axis at locations in which the blocking portions and the first curved portions are connected.

8. The lens assembly of claim 1, wherein each blocking portion extends closer to an optical axis than a virtual straight line connecting ends of the first curved portions connected to the blocking portion.

9. The lens assembly of claim 1, wherein end surfaces of the blocking portions are curved surfaces.

10. The lens assembly of claim 1, wherein each blocking portion has an inclined surface, and
    a central portion of the inclined surface protrudes further toward an optical axis than a remaining portion of the inclined surface.

11. The lens assembly of claim 1, wherein each blocking portion has a curved surface, and
    a central portion of the curved surface protrudes further toward an optical axis than a remaining portion of the curved surface.

12. A portable electronic device comprising:
    a camera module comprising the lens assembly of claim 1; and
    a display unit configured to output an image corresponding to light incident through the lens assembly converted into an electrical signal.

13. A camera module comprising:
    a lens comprising:
        an optical portion configured to refract light; and
        a flange portion extending along a periphery of at least a portion of the optical portion;
    a spacer in contact with the lens and comprising an incident hole through which the light passes;
    a lens barrel accommodating the lens and the spacer; and
    an image sensor disposed on a bottom of the lens barrel,
    wherein D-cut portions comprising a flat surface are formed on corresponding portions of each of the lens, the spacer, and the lens barrel,
    blocking portions corresponding to the D-cut portions are formed on an inner side surface of the spacer, and
    portions of the inner side surface of the spacer connected to ends of the blocking portions in a length direction thereof have a shape depressed relative to the blocking portions in a direction away from an optical axis.

14. The camera module of claim 13, wherein the image sensor comprises two long sides and two short sides forming a rectangular shape, and
    the long sides of the image sensor are disposed to correspond to the D-cut portions.

15. The camera module of claim 14, wherein the blocking portions are two blocking portions opposing each other, and
    two first curved portions connecting the pair of blocking portions to each other are formed on the inner side surface of the spacer.

16. The camera module of claim 15, wherein the blocking portions and the first curved portions are discontinuously connected to each other.

17. A portable electronic device comprising:
the camera module of claim 13; and
a display unit,
wherein the camera module is installed as a front camera of the portable electronic device along with the display unit on one side of the portable electronic device, or as a back camera of the portable electronic device on a side of the portable electronic device other than a side of the portable electronic device on which the display unit is installed.

18. A spacer in a lens assembly, the spacer comprising:
an inner side surface defining an incident hole extending from an object-side surface of the spacer to an image-side surface of the spacer,
wherein the inner side surface comprises:
first curved portions disposed opposing each other across the incident hole; and
blocking portions disposed between the first curved portions and protruding into the incident hole from the first curved portions, and
end surfaces of the blocking portions extend from the blocking portions to the first curved portions to define transmission portions.

19. The spacer of claim 18, wherein the end surfaces of the blocking portions are convex curved surfaces or concave curved surfaces.

20. The spacer of claim 18, further comprising an outer side surface extending from the object-side surface to the image-side surface,
wherein the outer side surface comprises:
D-cut portions corresponding to the blocking portions; and
second curved portions corresponding to the first curved portions.

* * * * *